July 17, 1956

M. A. JOHNSON 2,754,720

STRIP CUP FOR DETECTING THE PRESENCE OF GARGET
OR MASTITIS IN THE UDDER OF A MILK COW
Filed July 28, 1953

INVENTOR
Max A. Johnson

BY
McMorrow, Berman & Davidson
ATTORNEYS

Patented July 17, 1956

2,754,720

STRIP CUP FOR DETECTING THE PRESENCE OF GARGET OR MASTITIS IN THE UDDER OF A MILK COW

Max A. Johnson, Corpus Christi, Tex.

Application July 28, 1953, Serial No. 370,820

1 Claim. (Cl. 88—14)

This invention relates to strip cup for detecting the presence of garget or mastitis in the udder of a milk cow and has for its primary object to facilitate the early detection of the presence of the diseases so as to enable the herder to take corrective steps before the infection spreads.

Another object is to prevent the contamination of large quantities of milk.

In the ordinary conduct of the dairying industry, it is customary to strip the milk from the teats before the application of mechanical milking equipment in order to remove milk which is likely to be contaminated by bacteria. Such stripping of the milk from the teats, however, does not necessarily remove the danger of contamination for the reason that the trouble may extend into the udder. The presence of the bacteria in the milk stripped from the teats has heretofore been detected by distributing the milk samples in separate thin layers or films on a surface, usually of a black composition to provide a background against which the indications of contaminated milk may be readily seen. Such visual inspection, however, is not always indicative of the true conditions and in studying the problem I have discovered that contaminated milk will not readily mix with fresh uncontaminated milk and consequently another object of this invention is to employ this discovery in testing milk samples.

The above and other objects may be attained by employing this invention which embodies among its features a receptacle having an open upper end, lugs carried by the receptacle and extending inwardly therefrom adjacent the open upper end thereof, bosses carried by the lugs and extending upwardly therefrom adjacent the receptacle to define stops spaced from the receptacle, and a disk removably seated on the lugs and engaging the bosses for supporting a test specimen for inspection through the open upper end of the receptacle.

Other features include extracting from one quarter of the udder of a milk cow a milk specimen, depositing said specimen in the form of a globule, and extracting milk specimens from successive quarters of the udder of the milk cow and directing them into the globule initially deposited.

Figure 1:
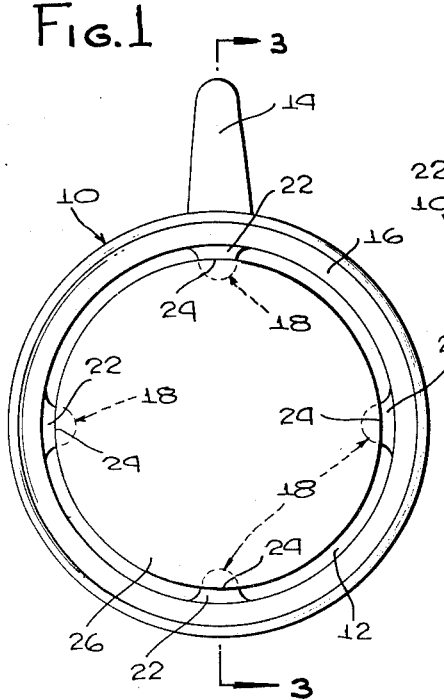
Figure 1 is a flat plan view of a strip cup embodying the features of this invention.
Figure 2:
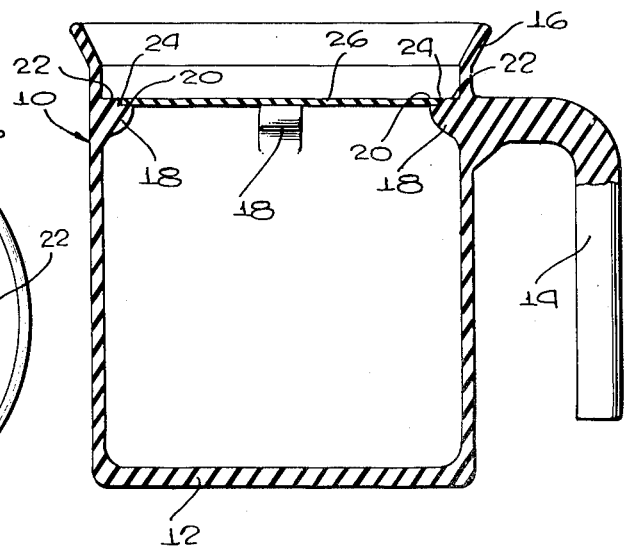
Figure 2 is a sectional view taken substantially on the line 2—2 of Figure 1.
Figure 4:
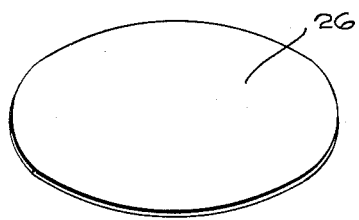
Figure 4 is a perspective view of the specimen disk.
Figure 3:
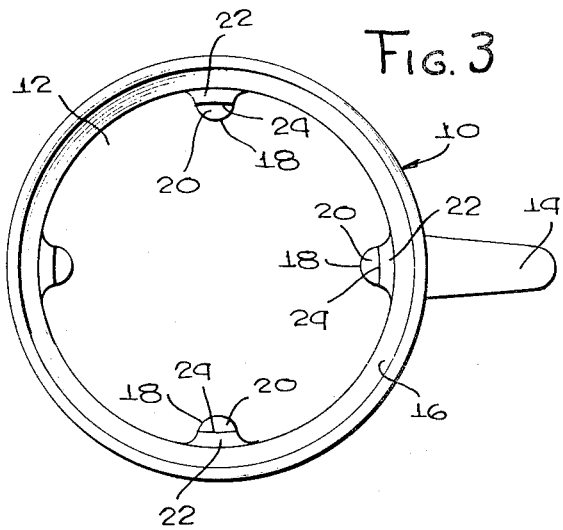
Figure 3 is a plan view similar to Figure 1, showing the specimen supporting disk removed from the strip cup.

Referring to the drawings in detail, a strip cup designated generally 10 comprises a receptacle 12 having an open upper end and carried by the receptacle 12 and extending along the outer side thereof, is a handle 14. The upper end of the receptacle is provided with an outwardly flared portion 16, and carried by the receptacle below the open upper end thereof are inwardly extending lugs 18, the upper surfaces 20 of which are disposed slightly below the lower end of the flared portion 16. Carried by the lugs and extending upwardly therefrom between the inner ends of the lugs 18 and the wall of the receptacle are bosses 22 which define at their inner edges stops 24 for engagement with the specimen supporting disk to hold the periphery of said disk in spaced concentric relation with the wall of the receptacle.

Removably seated on the supporting surfaces 20 of the lugs 18 and in peripheral contact with the stops 24 is a disk 26 which is preferably formed of a composition having a black color. The receptacle 12 is preferably formed of rubber or like substance capable of sterilization without deformation and which will be resilient and moderately flexible.

In use, the cup is held by the user with the disk 26 lying substantially horizontal. With the cup disposed below the udder of the cow, a specimen of the milk is extracted from one teat and deposited in the form of a globule on the disk 26 near the center thereof. A sample is then extracted from successive teats of the cow and directed into the globule initially deposited. If the milk is uninfected, the sample or specimens subsequently deposited on the initial globule will be absorbed thereby with no tendency at separation, the milk will be found to be free from contamination. On the other hand, any sample which fails to mix with the globule initially deposited will indicate that contamination is present and that the milk is unfit for use. It will thus be seen that by initially extracting the specimen from one quarter of the under of a milk cow, depositing said specimen in the form of a globule, and extracting milk specimens from successive quarters of the udder of a milk cow and directing them into the globule initially deposited, an indication of the wholesomeness of the milk can be obtained.

Besides employing a black background, as above suggested, another method of testing milk involves the deposit of the milk samples on a fine mesh fabric such as a fine wire screen or satin cloth. My method in which this improved cup is employed enables the results to be known anywhere from 36 to 48 hours ahead of prior methods known to me.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A strip cup comprising a receptacle having an open upper end, a handle carried by the receptacle and extending in outwardly spaced relation thereto, lugs carried by the receptacle and extending inwardly therefrom adjacent the open upper end thereof, bosses carried by the lugs and extending upwardly therefrom adjacent the receptacle to define stops spaced from the receptacle, and a disk removably seated on the lugs and engaging the bosses for supporting a test specimen for inspection through the open upper end of the receptacle, and the periphery of the disk being held in concentric spaced relation to the cup by the stops.

References Cited in the file of this patent

UNITED STATES PATENTS

| | | |
|---|---|---|
| 2,460,101 | McMurray | Jan. 25, 1949 |
| 2,517,490 | Hvam | Aug. 1, 1950 |